Figure 1:
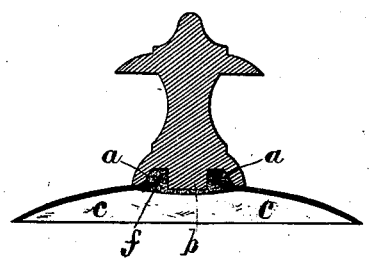
Figure 2:
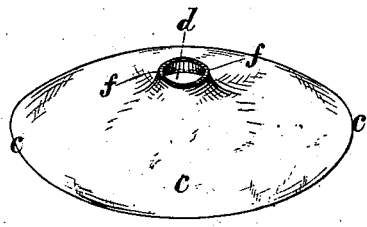
Figure 3:
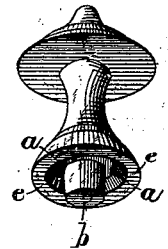

W. B. CHOATE.
Knob for Tea and Coffee Pots.

No. 204,198. Patented May 28, 1878.

WITNESSES:
Jas. C. Hutchinson
Pennington Halsted

INVENTOR.
William B. Choate
by John J. Halsted
Atty.

United States Patent Office.

WILLIAM B. CHOATE, OF AURORA, ILLINOIS.

IMPROVEMENT IN KNOBS FOR TEA AND COFFEE POTS.

Specification forming part of Letters Patent No. 204,198, dated May 28, 1878; application filed April 29, 1878.

*To all whom it may concern:*

Be it known that I, WILLIAM B. CHOATE, of Aurora, in the county of Kane and State of Illinois, have invented certain new and useful Improvements in Knobs for Tea and Coffee Pot Covers, &c.; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention consists in a special and improved construction of knobs used as handles for the covers of sheet-metal tea-pots, coffee-pots, and similar articles, and in an improved mode of applying and securing such knobs to the covers; the objects of the improvement being to save time, labor, and expense in manufacturing, to make a much stronger and quicker job, to avoid the liability of the knob being put on crooked, to save solder, to insure a closer and truer fit of the knob to its cover, and to enable unskilled workmen to make good work.

The customary or existing manner of attaching knobs is as follows: After punching in the cover the proper-sized hole to receive the short pintle or pin of the knob, the burr left by the punch has next to be flattened down, in order to permit the body or broader surface of the knob to lie tolerably close to the cover. But this burr very frequently is not perfectly or evenly flattened, and thus the knob not only cannot make a close fit with the surface of the cover, but it is always liable to lean more or less to one side, and when soldered the job is an imperfect and unsatisfactory one, besides requiring a needless amount of solder, and which is greater in proportion as the work is unskillfully done.

By my invention I not only dispense with any hammering, flattening down, or any reducing of the burr left by the punch, but I purposely retain it and successfully utilize it, to give increased strength and firmness to the united knob and cover.

I make the under side or face of the knob with an annular groove, $a$, between its periphery and the short central pin or pintle $b$, this groove having a breadth and depth sufficient to completely receive the burr left on the cover $c$ by punching the hole $d$, and also to receive sufficient solder to secure the knob to the cover.

From this construction result, as will be readily seen, the following advantages, viz: When the pintle $b$ is inserted in the hole $d$ the annular rib or ring $e$ which surrounds the groove $a$ is free to come in direct or close contact with the face of the cover, leaving no unsightly gap or solder between them, and insuring a proper or erect position of the knob upon its cover, so that it shall stand true, and, in fact, almost rendering it impossible to put it on crooked; also, inasmuch as the burr $f$, which stands up from the surface of the cover, projects upward into the groove $a$ of the knob, it permits the solder to hold it on both sides, and at the same time the amount of solder needed is reduced to the extent of the space occupied by the burr.

When thus soldered together the strength and durability are very much enhanced, as the burr becomes more or less embedded in the solder which is in the cavity of the knob, and the cover is also held by the solder on its under side, thus affording a double purchase or hold, and the knob is thus able to withstand blows or strains which would loosen or detach knobs applied in the ordinary mode.

It will now be readily seen that but little skill is required to fasten the knob in the proper upright position to the cover, the construction of the parts themselves insuring this true position; that the joint is a very strong one; that the flattening or cutting away of the burr is avoided, and the cover is left in a more finished condition, and yet can be made cheaper than in the old way.

I claim—

1. The knob or handle for metal covers of tea-pots, coffee-pots, and similar articles, made with an annular groove, $a$, in its lower end or face, and surrounding the central short pin $b$, for the purpose set forth.

2. The improved joint or seam connecting the knob to its cover, the same consisting of the burr $d$, projecting upward from the cover, and the annular cavity or groove $a$ in the knob, these parts being united together by solder, in the manner shown and described.

3. The improved cover described, composed of the knob with the annular groove, the cover $c$, with its upturned burr $f$ projecting into such groove, and the solder uniting their parts together.

WILLIAM BURNHAM CHOATE.

Witnesses:
JOHN WILLIAM KENDALL,
ALONZO E. SEARLES.